(12) United States Patent
Li et al.

(10) Patent No.: US 8,756,184 B2
(45) Date of Patent: Jun. 17, 2014

(54) PREDICTING USERS' ATTRIBUTES BASED ON USERS' BEHAVIORS

(75) Inventors: Hang Li, Beijing (CN); Hua Zheng, Beijing (CN); Ting-hao Yang, Beijing (CN); Richard W. Tom, Los Angeles, CA (US); Yupeng Liao, Beijing (CN); Qi Zhang, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 735 days.

(21) Appl. No.: 12/957,649

(22) Filed: Dec. 1, 2010

(65) Prior Publication Data

US 2011/0131166 A1   Jun. 2, 2011

Related U.S. Application Data

(60) Provisional application No. 61/265,630, filed on Dec. 1, 2009.

(51) Int. Cl.
*G06F 15/18* (2006.01)
*G06N 3/08* (2006.01)
*G06N 3/04* (2006.01)
*G06N 7/00* (2006.01)

(52) U.S. Cl.
CPC ............. *G06N 3/0436* (2013.01); *G06N 7/005* (2013.01); *G06F 15/18* (2013.01); *G06N 3/08* (2013.01)
USPC .......................................................... 706/25

(58) Field of Classification Search
CPC ....... G06N 7/005; G06N 3/08; G06N 3/0436; G06F 15/18
USPC .......................................................... 725/24
See application file for complete search history.

(56) References Cited

U.S. PATENT DOCUMENTS

| 5,889,506 A | 3/1999 | Lopresti et al. | |
|---|---|---|---|
| 7,340,760 B2* | 3/2008 | Wachtfogel et al. | 725/34 |
| 2002/0059092 A1* | 5/2002 | Naito et al. | 705/10 |
| 2005/0193014 A1 | 9/2005 | Prince | |
| 2007/0300225 A1* | 12/2007 | Macbeth et al. | 718/100 |
| 2008/0320510 A1* | 12/2008 | Wong et al. | 725/24 |
| 2009/0037398 A1* | 2/2009 | Horvitz et al. | 707/4 |
| 2009/0248496 A1* | 10/2009 | Hueter et al. | 705/10 |
| 2009/0259647 A1 | 10/2009 | Curtis | |

OTHER PUBLICATIONS

'Elements of Artificial Neural Networks': Mehrotra, 1997, MIT Press.*

* cited by examiner

*Primary Examiner* — Kakali Chaki
*Assistant Examiner* — Peter Coughlan
(74) *Attorney, Agent, or Firm* — Fountainhead Law Group P.C.

(57) ABSTRACT

A method, apparatus, system, article of manufacture, and computer readable storage medium provide the ability to predict and utilize a user's attributes. A sample user behavior and a sample user attribute are collected. A model is trained based on the sample user behavior and sample user attribute. Using the model, a probability of a predicted user attribute based on the sample user behavior is predicted. Using the model and the probability, the predicted user attribute is fuzzily determined based on a real user behavior. The predicted user attribute is used to improve a user's experience.

32 Claims, 4 Drawing Sheets

PREDICTING USERS' ATTRIBUTES BASED ON USERS' BEHAVIORS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/265,630, filed on Dec. 1, 2009, by Hang Li, Hua Zheng, Ting-hao Yang, Richard W. Tom, Yupeng Liao, and Qi Zhang, entitled "Fuzzy Users' Attributes Prediction Based on Users' Behaviors".

BACKGROUND OF THE INVENTION

1. Field of the Invention

The present invention relates generally to an Internet user's attributes, and in particular, to a method, apparatus, and article of manufacture for predicting a users' attributes based on the users' behaviors using fuzzy logic.

2. Description of the Related Art

Users' attributes are useful in many computer/Internet applications such as personalized recommendations, advertisement targeting, etc. Such a use of attributes can significantly improve a user's experience. However, only a small portion of users voluntarily provide their attributes. For example, some users may provide their attributes when registering/signing up on/to a website/online service. However, other users, even if registering/signing up online may not provide their attributes. Prior art systems fail to provide the ability to determine a users' attributes.

SUMMARY OF THE INVENTION

To overcome the problems of the prior art, embodiments of the invention develop and build a model to simulate and predict user attributes based on user behavior. Sample/test data for users with known behaviors and attributes is used to build the model. Based on a distribution of the sample user attributes compared to the attributed predicted from the model, probabilities for particular user attributes based on certain behaviors can be developed. Thereafter, such probabilities are used with real user behaviors to fuzzily determine and predict corresponding attributes for the real users. The predicted corresponding attributes can then be used to improve a user's experience (e.g., via targeted advertising, customized/personalized recommendations/content, etc.).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
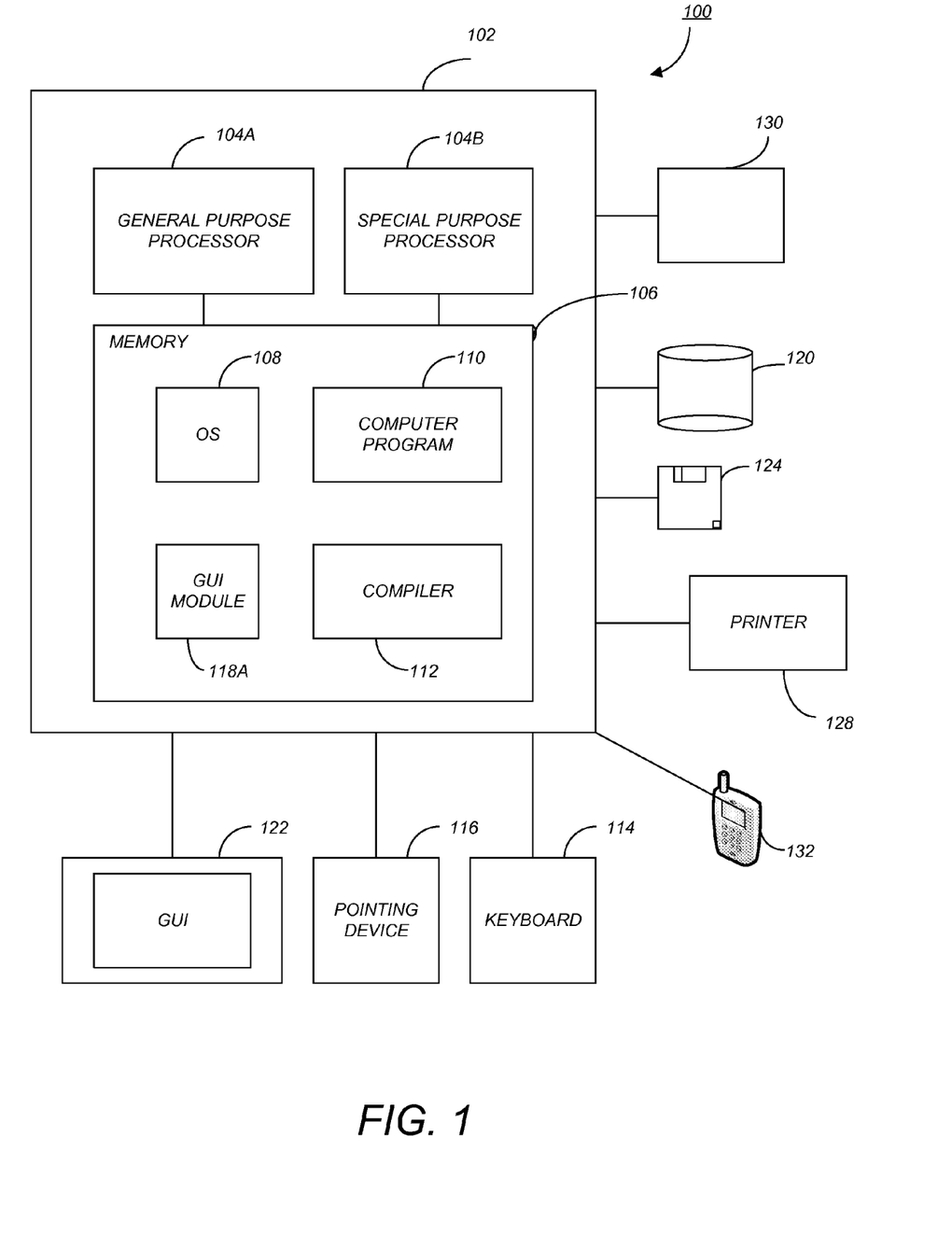
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a media viewing/listening device 132 (e.g., an MP3 player, iPod™, Nook™, portable digital video player, cellular device, personal digital assistant, iPad™, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Figure 2:
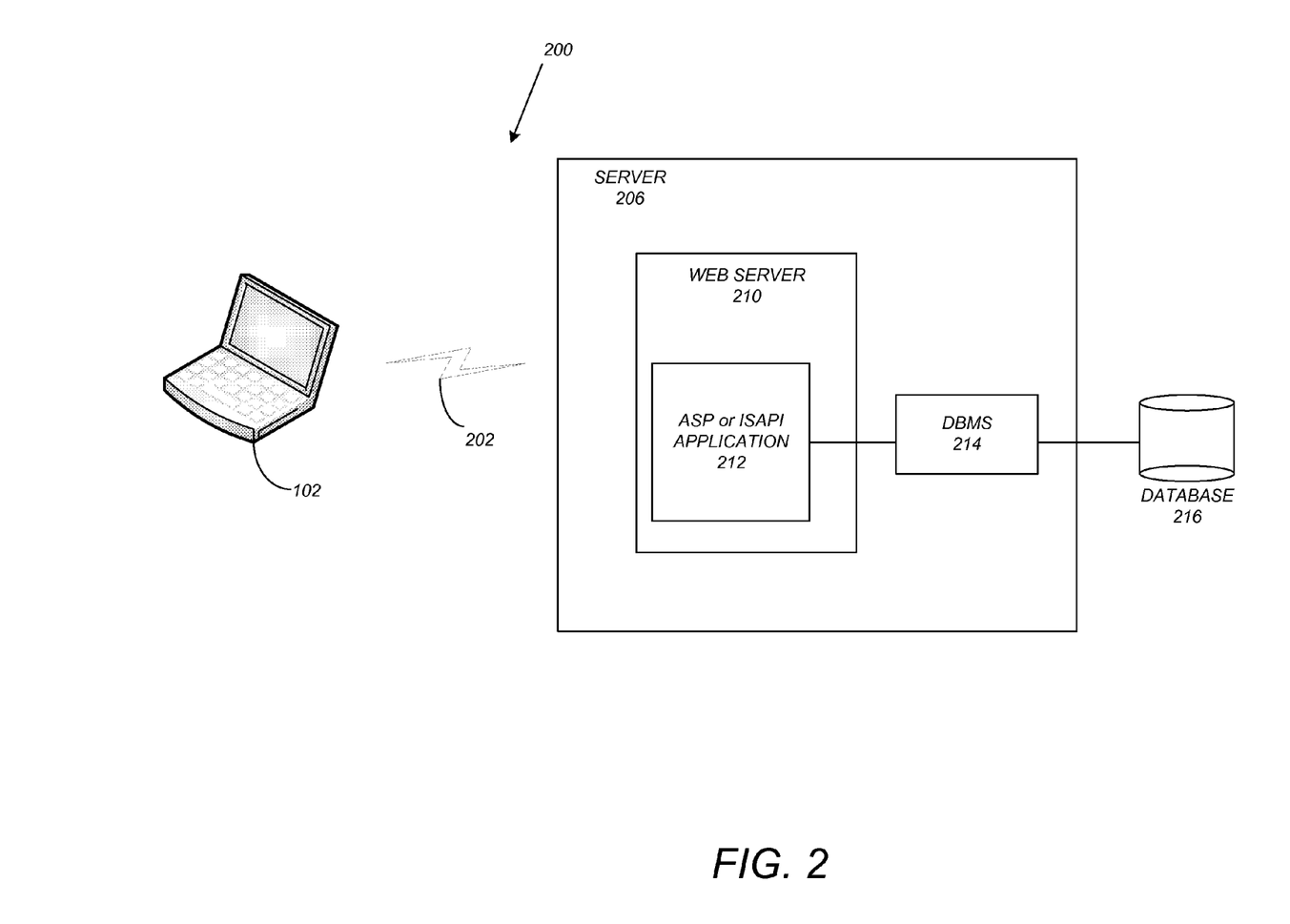
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. In one or more embodiments of the invention, a user/client 102 views media content (e.g., audio-visual programs such as television shows, movies, etc.) on a website or online service that transmits (e.g., via unicast, multicast, broadcast, etc.) such content (e.g., Hulu™). Such websites may also offer different levels of service for those users that elect to register or sign-up. For example, one level of service may offer basic low resolution media content with advertising, another level of service may offer the same resolution without advertising, a third level of service may offer high definition media content, and/or a fourth level may offer the ability to stream the content to a television, mobile device, or computer. Any combination of services/content may be offered across one or more levels.

When signing up for such a service, users have the option of providing/specifying attributes. Such attributes include, but are not limited to, a user's demographic information (e.g., gender, race, age, income/income range, disabilities, mobility [in terms of travel time to work or number of vehicles available], educational attainment, home ownership, employment status, profession, etc.), user's geographical location, etc. However, as described above, many users may not specify attributes. Further, if a user has not registered and/or does not sign up, the registration information is unknown. As further described above, it is desirable to maintain or have knowledge of such attributes in order to provide personalized recommendations, advertisement targeting, etc. and to further improve the user experience.

One or more embodiments of the invention provide the ability to fuzzily predict users' attributes based on the users' behaviors. User behaviors include, but are not limited to, information based on the shows a user has watched, information based on a user's review, information based on user's interaction, etc. In this regard, a user may browse to a particular website (e.g., Hulu.com) to view media content such as television shows, films, shorts, etc. Such a website may collect information about the users' viewing habits (e.g., using a cookie or other mechanism). Based on such behavior, embodiments of the invention can predict various attributes of the user and then use such attributes to personalize or enhance the experience for the user.

Figure 3:
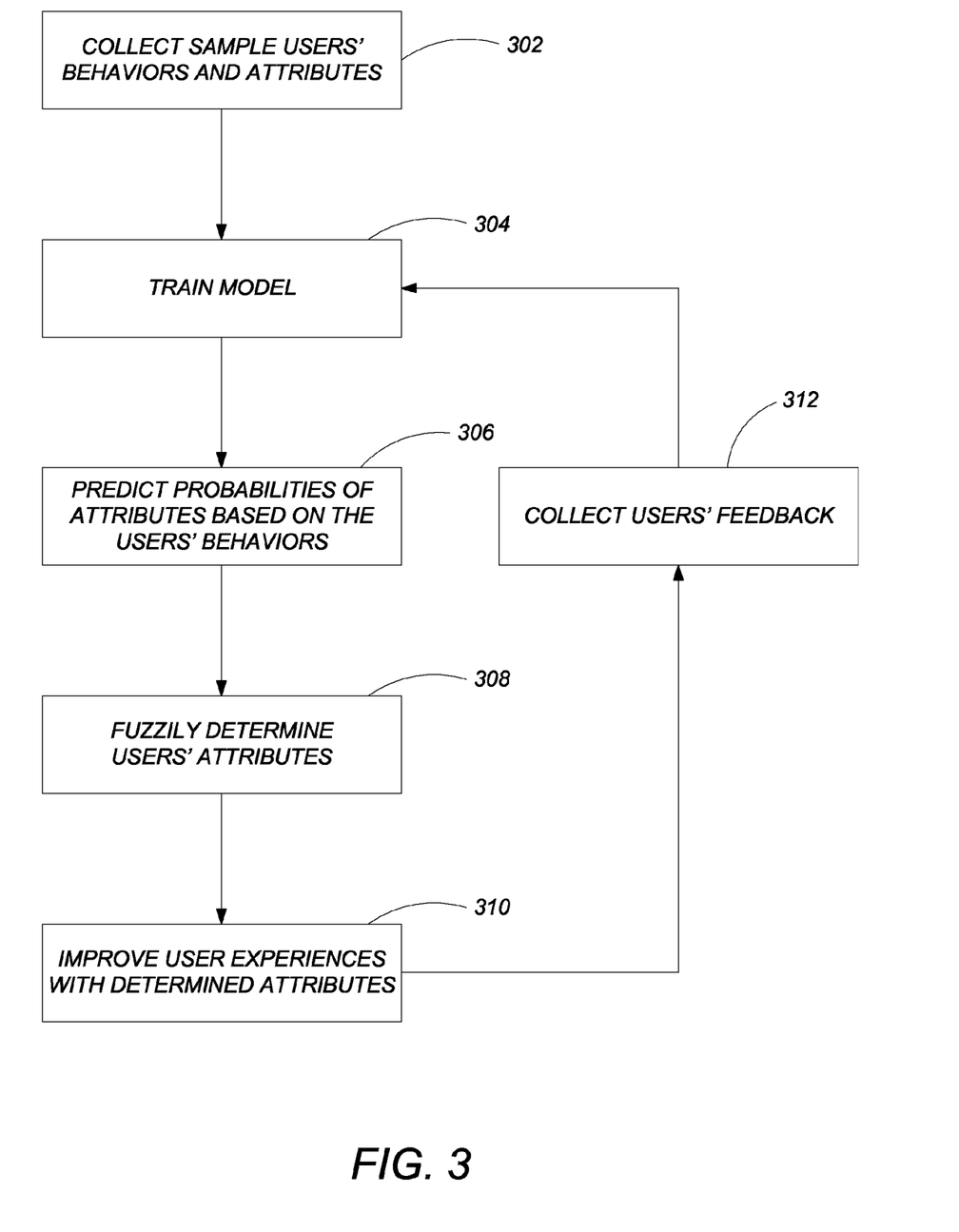
FIG. 3 is a flow chart illustrating the logical flow for fuzzily determining and using a user's attributes in accordance with one or more embodiments of the invention.

FIG. 3 is a flow chart illustrating the logical flow for fuzzily determining and using a user's attributes in accordance with one or more embodiments of the invention.

At step 302, sample users' behaviors and attributes are collected. As described above, some users are registered or have signed up with a media content delivery host (e.g., a website). The attributes of such users may be provided or known (e.g., gender, age, location, etc.). Further, as such users view media content, such viewing behavior may be tracked and/or collected (e.g., recorded) by the media content delivery host (e.g., via cookies, web bug, and/or other tracking mechanism). Information about the user's behavior may include the media content viewed (e.g., the users' watched history), subscribed contents, queued contents, rated contents, the geographic location where the content was viewed, when the content was viewed, the percentage/amount of a particular media content that was viewed (e.g., if only one-half of a particular television episode was viewed), etc. Further information may include the internet protocol (IP) address of the user, the browser type, the computer type, etc. In general, embodiments of the invention will gather and store (e.g., in a database) as much information about the user's behavior as possible.

The collection step 302 may also attempt to determine which media content a user is interested in. For example, media content that has only been partially viewed by a user may be filtered out of the sample behaviors that are collected. Alternatively, a threshold level/percentage of media content viewed may be used. In yet another alternative, a minimum number of viewings of episodes of a particular show may be required before a determination of interest in a particular show is made. In this regard, some embodiments of the invention may only collect behavioral information for the media content that the system has determined the user is interested in.

At step 304, a computer model that is capable of generating a probability is initialized/implemented/trained. Any model that is capable of generating a probability may be used. Exemplary models include a Bayesian network and/or a neural network.

A Bayesian network is a directed acyclic graphical model that represents a set of random variables and their conditional dependencies via a directed acyclic graph (DAG). Nodes of the graph represent variables (e.g., the users' attributes), edges represent conditional dependencies and each node is associated with a probability function that takes as input a particular set of values for a node's parent variables (e.g., the behaviors) and determines a probability of the variable (e.g., the attribute) represented by the node. For example, if eight (8) people that watch a particular media show have a specific attribute, and two (2) people that watch the same media show have a different attribute, a Bayesian network would predict an eighty percent (80%) probability that a person watching that media show has the specific attribute. Thus, a Bayesian network can determine a probability based on a number of people watching a particular show/media content. Such a probability can then be used to determine attributes of other users.

The training step 304 would examine existing users' behaviors and their attributes to train and build the model that could then be used for other users with unknown attributes (but known behaviors).

In a neural network (or a modified neural network), a network is composed of a group of neurons or nodes. Provided with a set of input(s) and output(s), the neural network determines a function performed by the nodes on the input(s) to produce the outputs. The training process 304 is the process for determining the functions.

Figure 4:
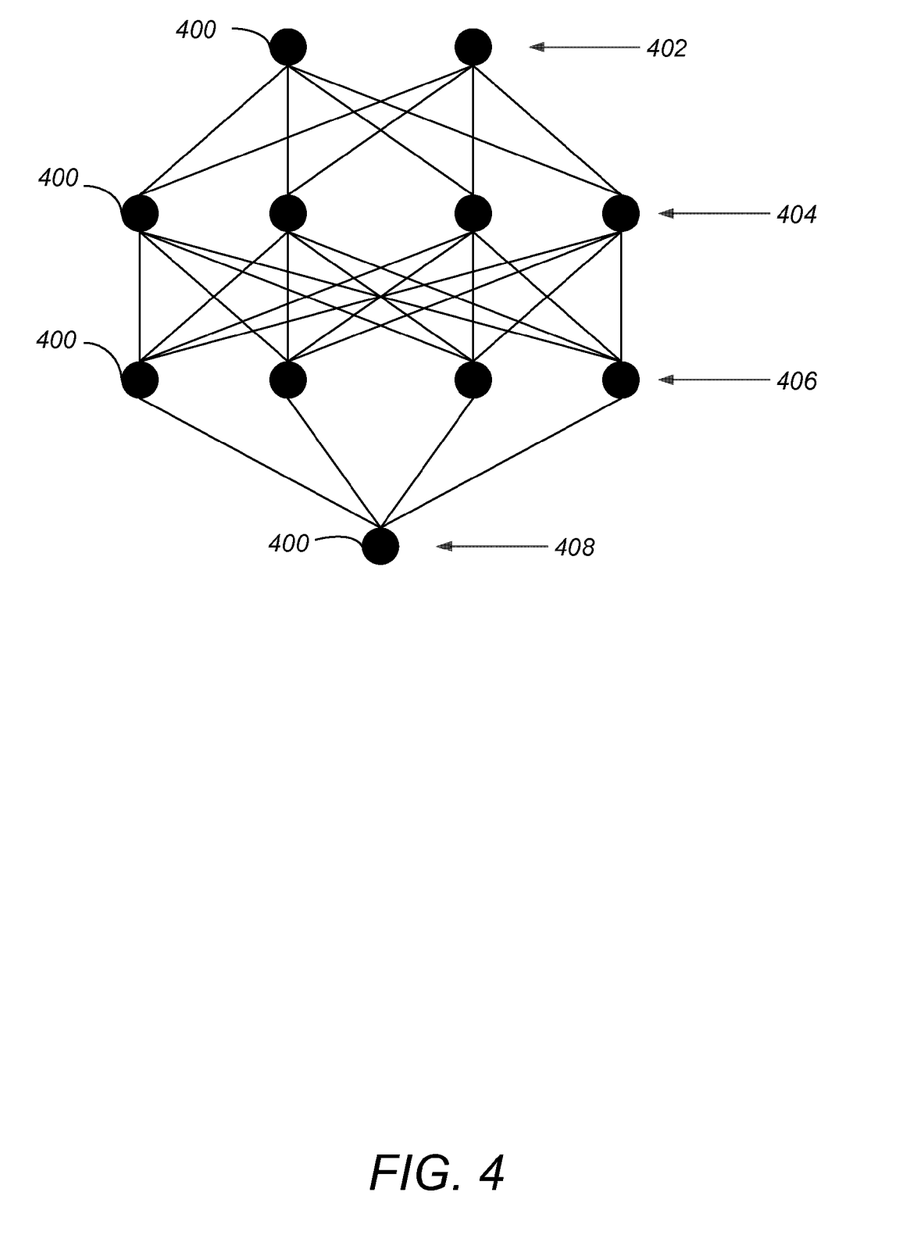
FIG. 4 illustrates a simple neural network in accordance with one or more embodiments of the invention.

FIG. 4 illustrates a simple neural network in accordance with one or more embodiments of the invention. Each node 400 in the network is connected to every node in the previous and next layer. Input layer 402 has two input nodes/neurons 400. There are two layers 404 and 406 of four (4) nodes/neurons each, and one node/neuron 400 in output layer 408. Each node 400 has an associated weight and the links/edges between nodes 400 represent how to determine/calculate the weights. During the training stage 304, the neural network determines the weights in each node given the inputs 402 and outputs 408. Such a relationship between inputs 402 and outputs 408 are often nonlinear in a neural network.

Using FIG. 4 as an example, one can attempt to determine the weights for a given set of inputs 402 and outputs 408. Assume the two input nodes have weights of 1.0 and 0.0 while the output node has a weight of 2.0. To determine the weights in the second layer 404 (based on the input layer 402), one or more embodiments adds up 1 times the value of the first input node (1.0) to 1 times the value of the second input node (0.0) for each node−(1*1.0)+(1*0.0) resulting in a weight of 1.0 for each node in the second layer 404. To determine the weights in the third layer 406, the same process is used to come up with (1*1.0)+(1*1.0)+(1*1.0)+(1*1.0) providing a weight of 4.0 for each node in the third layer 406. Using the same formula, the output node 408 would have a weight of 16.0. The weight of 16.0 is compared to the actual output weight (2.0) and the neural network attempts to reduce it so that they match. Accordingly, all weights for the links/edges going into the output are lowered and the weights are recalculated. This process is repeated until the output is 2.0 based on the input weights provided. In this regard, one may view the processing as providing the ability to propagate the weights from the outputs 408 to the inputs 402 (and/or vice versa).

In embodiments of the present invention, the inputs 402 are a user's behavior and values are assigned to each node that references a behavior. The output(s) 408 represent the attributes of the user. Using the known user's behaviors and attributes, one can train the neural network to produce a given output 408 (e.g., attribute) based on a given input 402 (e.g., behavior). Thus, each attribute or the combination of several attributes is used to train 304 the neural network model. Users' behaviors are the input and attributes are the output of that neural network. Further the users' behaviors may be normalized and/or standardized for the inputs. Further, user's feedback may be treated as one part of the behaviors (see the description of step 312 below).

In view of the above, the model is trained for numerous different sample users. However, as one might assume, different users that watch the same media content (i.e., their behavior) may have different attributes (e.g., male v. female). The neural network is trained using multiple users' behavioral data and attributes. Accordingly, after processing the various edges/links for one user, the behavioral and attribute data for different users are used to adjust those values/weights. In this manner, the neural network reflects/considers a broad range of the sample users behavior and attributes collected at step 302. After all of the training at step 304 is complete, the inputs may have certain values 402 but the outputs 408 and weights will not match every (or potentially any) user exactly.

Different types of input may be treated differently by the neural network. For example, assume a nominal input with n labels. If n is more than two, it is taken as a Boolean vector of n dimensions. If the nominal input only has two labels, it would be taken as only one Boolean input. For a scale input, the input may be split into a number of segments with each segment treated as a separate input.

Similarly, different types of outputs should also be treated differently. The approach is similar to that of inputs. However, if the nominal output has only two labels, it may be taken as a two-dimension Boolean vector but not one Boolean output.

Approaches such as simulated annealing or other optimization methods may be used to obtain a local optimum as a training start. Further, sample users may be divided into a training set and test set in order to avoid overtraining In view of the above, one may note that a neural network model can be used to receive a significant amount of input data and generate weights accordingly. Such a network is computationally feral because it is nonlinear and is able to achieve a stable state (based on prior calculations) in a reasonable time frame.

Once the training 304 has been completed (and/or as part of the training process), the validity of the model may be verified through an evaluator such as ROC (receiving operator characteristic) parameter/curve.

After training 304, to utilize the model, the outputs 408 need to be turned into probabilities. Thus, at step 306, the probabilities of output attributes are predicted based on the users' behaviors based on the model. In the case of Boolean values (e.g., gender), there may only be a single output 408. However, in the case of non-boolean values (e.g., income), the output layer 408 may have several nodes representing the different outputs such as income amounts (e.g., $0-$15K, $15K-$25K, $25K-$50K, etc.). During the training 304 of a particular user, only one output may be activated (e.g., the income range for a particular user may have a value of 1.0 with the rest having a value of 0.0). However, as described above, once all of the training 304 has been performed, various values in the different output nodes 408 may exist in the model (e.g., 0.1, 0.2, 0.8, 0.1, etc.).

To produce the probabilities, the training data (i.e., with the known inputs 402 and outputs 408) are input back into the model. As described, above, since the training combines multiple different users, the output values (i.e., attributes) in nodes 408 produced from known inputs (i.e., behaviors) are unlikely to produce the actual known corresponding outputs. Once the known input values 402 are processed by the model to produce output values 408, the distribution of the results may be examined. The distribution may be examined using a fit algorithm (e.g., least squared fit) to determine where a new data point (i.e., a predicted attribute or output value 408) from a person lies. The actual known output values corresponding to a particular input value may then be compared to the produced output values 408 to compute a probability.

For example, assume that sample data set (of training values) provides for corresponding (input,output) values (e.g., [certain input behavior, output attribute]) of (1.0, 0.9), (1.0, 0.0), (1.0, 0.2), (1.0, 5.0), (1.0, 0.2). The network may be trained with such values and assume it results in a trained output value of 0.2 based on an input of 1.0. In step 306, the sample data set is processed by the network to produce the probabilities. Accordingly, the input from each sample data set is processed by the network to produce the output of 0.2. The actual outputs in each data set can then be compared to produce a probability that the user will fall into the particular output bucket of 0.2. In the example above, two of the five sample users have an output of 0.2. Accordingly, it can be predicted that 40% of users with an input of 1.0 will have an output of 0.2. Similarly, if 200 of 1000 cases actually have an input of 1.0 and an output of 0.2, then one can determine that if a user has a 1.0 input, there is a 20% probability that the user will have a 0.2 output. The likelihood of the results can be graphed and used to determine the likelihood of a user with a particular behavioral input having a specific output.

In view of the above, the model may be used to predict a user's attributes based on the user's watching behaviors. The same method/data from the training phase 304 is used to process different types of inputs and output the results to produce the probabilities.

Once the probabilities of the attributes have been predicted at step 306, the user's attributes can be determined using fuzzy logic at step 308. Fuzzy logic is a superset of conventional (Boolean) logic that has been extended to handle the concept of partial truth—truth values between "completely true" and "completely false".

With fuzzy logic, continuous truth values are permitted such that system variables may take a continuous range of truth-value memberships in the interval [0,1], rather than strict binary (True or False) decisions and assignments. For example, if it is cloudy and overcast, the statement "it is raining" could have a True value of 0.8, and a False value of 0.2. Likewise, the statement "The current user is a visitor" has the value 0.85 if highly likely, 0.1 if highly unlikely, and 0.05 if the answer is "maybe".

Applying such a concept to the embodiments of the present invention provides the ability to process a user's behavior (as input) to produce a range representing the probability the user will have an attribute corresponding to that range. Accordingly, a soft decision is made to determine the predicted probabilities from step 306 so that each demographic attribute can be fuzzily determined.

In accordance with one or more embodiments of the invention, each output 408 in a model represents an attribute that may also be referred to as a label of the attributes. For each label of the attributes, a cumulative probability is calculated as follows:

$$CumulativeProbability(i) = \sum_{k=1}^{i} Pr(k)$$

In addition, a random number is generated. If the random number is smaller than CumulativeProbability(i), then the attributed is determined as the $i^{th}$ label. If the random number is equal to or larger than CumulativeProbability(i), then the cumulative probability is calculated for the next label. The process is then repeated/looped for each label until a determination has been found/computed.

As an alternative to making a soft decision, a hard decision can also be used to determine the probabilities. As used herein, a soft-decision provides the ability for a range of values in between [0,1] whereas a hard decision operates on data using a fixed set of possible values, typically 0 or 1 in binary code. Accordingly, the soft decision provides the ability to utilize fuzzy logic while a hard decision determines probabilities based on values of [0] and [1] and not ranges of values in the domain [0,1].

As an alternative to using the above system to determine the probabilities, a neural network may be designed to provide the probability directly.

With the fuzzily determined user's demographic attributes from step 308, the user experiences can be improved at step 310. As described above, such attributes can be used in many applications such as personalized recommendations or advertisement targeting to improve the user experience. For example, the attributes of a user may be used to provide flexibility for an advertiser desiring to target a particular user base. For example, the advertiser may pay more for an advertisement to target all users with a 95% likelihood of having a particular attribute and may pay less if the user has a 75% likelihood. Alternatively, the advertiser may have the option of only running an advertisement 75% of the time of the likelihood is only 75%. Thus, a variety of different approaches may be used that can be based on whether to target a certain percentage likelihood of an attribute, based on how often to execute an advertisement, based on only advertising to those users with a minimum percentage probability/likelihood of a particular attribute, etc.

As an example of the overall process, the user's watching history may be recorded (e.g., at step 302). If the user has watched several complete videos of a show, it can be determined that the user is interested in this show. An attempt is made (at step 302) to find all shows that each user might be interested in. The sample users' attributes and watching behaviors are used to train the predicting model for a "gender" demographic at step 304.

At step 306, the model is used to predict a user's "gender" from the user's watching behaviors. For example, if the probability of the user to be "male" is 80% (so the probability to be "female" is 20%), a soft decision (via step 308) can be used to determine that the user should be "male" in 80% probability, or a hard decision can be used to determine that the user is "male". If it is known that the user is male, more shows can be recommended to the user that men like at step 310.

At step 312, the user's feedback may be collected to improve the model in the training phase at step 304. For example, the user may indicate that a particular determined attribute does not apply to that user. Such information may then be fed back into the model to further train the model.

Explained another way, once the model is trained 304, the training data is input into the model to obtain a set of output data. The training data and results of reprocessing through the network can be used to determine a relationship/correspondence between a certain output in a particular node/bucket to the real result (i.e., the known output data). With the relationship/correspondence, the probabilities of all results can be determined (i.e., at step 306). Thereafter, when new input data is processed by the network, a new output result is produced and can be compared to the probabilities from the test data (i.e., at step 308). With the probability comparison, one can fuzzily determine the likelihood that the user has a particular attribute based on the behavioral input. Based on the predicted attribute for the user, the user experience can be improved (i.e., at step 310).

In addition to the above, one may note that some of the training data (i.e., used in step 304) may be skewed based on the population of users that register and/or provide their attributes/feedback. For example, most users that register may be male, accordingly, data may be biased/skewed based on such sample attribute data received from men. Embodiments of the invention may perform additional processing to take such a bias into account. For example, a determination of the skew/bias and how it impacts the processing may be determined. Thereafter, embodiments may attempt to try and imitate or account of the expected bias (e.g., by simulating female behavior or weighting the nodes differently).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to predict and utilize a user's attributes based on their behavior.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method comprising:
    collecting a plurality of sample user behaviors and a plurality of sample user attributes from a service that offers videos for viewing, wherein a sample user behavior is based on a sample user using the service and a sample user attribute is received from the sample user;
    training a model to be able to produce the plurality of sample user attributes from the plurality of sample user behaviors;
    after training, inputting the plurality of sample user behaviors into the trained model to produce predicted sample user attributes;
    comparing the plurality of sample user attributes and the plurality of sample user behaviors to the predicted sample user attributes to determine associated probabilities for the predicted sample user attributes;
    determining a real user behavior for a second user based on the second user using the service;
    predicting, using the model, that the second user has a predicted user attribute of an associated probability based on the user having the real user behavior, wherein the predicted user attribute of the associated probability is not known for the second user; and
    utilizing that the second user has the predicted user attribute of the associated probability to improve the second user's experience using the service.

2. The computer-implemented method of claim 1, wherein the model comprises a neural network model.

3. The computer-implemented method of claim 2, wherein training the model comprises:
    representing the sample user behavior as an input node having an input weight;

representing the sample user attribute as an output node having an output weight; and determining one or more functions based using one or more processing nodes, wherein the one or more functions are configured to produce the output weight based on the input weight.

4. The computer-implemented method of claim 3, wherein training further comprises combining additional sample user behaviors and additional sample user attributes from multiple users with the sample user behavior and sample user attribute.

5. The computer-implemented method of claim 1, wherein comparing comprises:

comparing a distribution of the sample user attribute for one or more sample users to the predicted attribute to determine the associated probability for the predicted attribute based on a number of sample users that actually have the predicted attribute.

6. The computer-implemented method of claim 1, wherein comparing determines the associated probability based on a least squared fit analysis based on the predicted user attribute and sample user behavior.

7. The computer-implemented method of claim 1, wherein predicting comprises:

processing the real user behavior in the model to produce the predicted user attribute and a cumulative probability as the associated probability for the predicted user attribute.

8. The computer-implemented method of claim 1, wherein utilizing comprises transmitting a personalized recommendation to a user based on predicting that the second user has the predicted user attribute of the associated probability.

9. The computer-implemented method of claim 1, wherein the utilizing comprises transmitting a targeted advertisement to a user based on predicting that the second user has the predicted user attribute of the associated probability.

10. The computer-implemented method of claim 1, further comprising collecting a user's feedback to improve the model by repeating the training using the user's feedback.

11. The computer-implemented method of claim 1, wherein utilizing comprises selectively providing an advertisement to the second user based on the predicted user attribute of the associated probability.

12. The computer-implemented method of claim 11, wherein utilizing comprises charging an advertiser of an advertisement delivered to the second user while the second user is watching a video using the service differently based on the predicted user attribute of the associated probability.

13. An apparatus for utilizing a user's predicted attributes in a computer system comprising:

(a) a computer having a memory;

(b) an application executing on the computer, wherein the application is configured to:

collect a plurality of sample user behaviors and a plurality of sample user attributes from a service that offers videos for viewing, wherein a sample user behavior is based on a sample user using the service and a sample user attribute is received from the sample user;

train a model to be able to produce the plurality of sample user attributes from the plurality of sample user behaviors;

after training, input the plurality of sample user behaviors into the trained model to produce predicted sample user attributes;

compare the plurality of sample user attributes and the plurality of sample user behaviors to the predicted sample user attributes to determine associated probabilities for the predicted sample user attributes;

determine a real user behavior for a second user based on the second user using the service;

predict, using the model, that the second user has a predicted user attribute of an associated probability based on the user having the real user behavior, wherein the predicted user attribute of the associated probability is not known for the second user; and utilize that the second user has the predicted user attribute of the associated probability to improve the second user's experience using the service.

14. The apparatus of claim 13, wherein the model comprises a neural network model.

15. The apparatus method of claim 14, wherein the application is configured to train a model by:

representing the sample user behavior as an input node having an input weight;

representing the sample user attribute as an output node having an output weight; and determining one or more functions based using one or more processing nodes, wherein the one or more functions are configured to produce the output weight based on the input weight.

16. The apparatus of claim 15, wherein the application is further configured to train by combining additional sample user behaviors and additional sample user attributes from multiple users with the sample user behavior and sample user attribute.

17. The apparatus of claim 13, wherein the application is configured to compare by:

compare a distribution of the sample user attribute for one or more sample users to the predicted attribute to determine the associated probability for the predicted attribute based on a number of sample users that actually have the predicted attribute.

18. The apparatus of claim 13, wherein the application is configured to compare by determining the associated probability based on a least squared fit analysis based on the predicted user attribute and sample user behavior.

19. The apparatus of claim 13, wherein the application is configured to predict by:

processing the real user behavior in the model to produce the predicted user attribute and a cumulative probability as the associated probability for the predicted user attribute.

20. The apparatus of claim 13, wherein the application is configured to utilize by transmitting a personalized recommendation to a user based on predicting that the second user has the predicted user attribute of the associated probability.

21. The apparatus of claim 13, wherein the application is configured to utilize by transmitting targeted advertisement to a user based on predicting that the second user has the predicted user attribute of the associated probability.

22. The apparatus of claim 13, wherein the application is configured to further collect a user's feedback to improve the model by repeating the training using the user's feedback.

23. A non-transitory computer readable storage medium encoded with computer program instructions which when accessed by a computer cause the computer to load the program instructions to a memory therein creating a special purpose data structure causing the computer to operate as a specially programmed computer, executing a method of utilizing a user's predicted attributes, comprising:

collecting, in the specially programmed computer, a plurality of sample user behaviors and a plurality of sample user attributes from a service that offers videos for viewing, wherein a sample user behavior is based on a sample user using the service and a sample user attribute is received from the sample user;

training, in the specially programmed computer, a model to be able to produce the plurality of sample user attributes from the plurality of sample user behaviors;

after training, inputting, in the specially programmed computer, the plurality of sample user behaviors into the trained model to produce predicted sample user attributes;

comparing, in the specially programmed computer, the plurality of sample user attributes and the plurality of sample user behaviors to the predicted sample user attributes to determine associated probabilities for the predicted sample user attributes;

determining, in the specially programmed computer, a real user behavior for a second user based on the second user using the service;

predicting, in the specially programmed computer, in the specially programmed computer, using the model, that the second user has a predicted user attribute of an associated probability based on the user having the real user behavior, wherein the predicted user attribute of the associated probability is not known for the second user; and utilizing, in the specially programmed computer, that the second user has the predicted user attribute of the associated probability to improve the second user's experience using the service.

24. The non-transitory computer readable storage medium of claim 21, wherein the model comprises a neural network model.

25. The non-transitory computer readable storage medium of claim 24, wherein the training a model comprises:

representing the sample user behavior as an input node having an input weight;

representing the sample user attribute as an output node having an output weight; and determining one or more functions based using one or more processing nodes, wherein the one or more functions are configured to produce the output weight based on the input weight.

26. The non-transitory computer readable storage medium of claim 25, wherein the training further comprises combining additional sample user behaviors and additional sample user attributes from multiple users with the sample user behavior and sample user attribute.

27. The computer readable storage medium of claim 23, wherein the comparing comprises:

comparing a distribution of the sample user attribute for one or more sample users to the predicted attribute to determine the associated probability for the predicted attribute based on a number of sample users that actually have the predicted attribute.

28. The non-transitory computer readable storage medium of claim 23, wherein the comparing determines the associated probability based on a least squared fit analysis based on the predicted user attribute and sample user behavior.

29. The non-transitory computer readable storage medium of claim 23, wherein predicting comprises:

processing the real user behavior in the model to produce the predicted user attribute and a cumulative probability as the associated probability for the predicted user attribute.

30. The non-transitory computer readable storage medium of claim 23, wherein the utilizing comprises transmitting a personalized recommendation to a user based on predicting that the second user has the predicted user attribute of the associated probability.

31. The non-transitory computer readable storage medium of claim 23, wherein the utilizing comprises transmitting targeted advertisement to a user based on predicting that the second user has the predicted user attribute of the associated probability.

32. The non-transitory computer readable storage medium of claim 23, further comprising collecting a user's feedback to improve the model by repeating the training using the user's feedback.

* * * * *